(12) United States Patent
Hsu et al.

(10) Patent No.: US 8,742,833 B2
(45) Date of Patent: Jun. 3, 2014

(54) CHARGE PUMP CIRCUIT AND METHOD THEREOF

(75) Inventors: Chin-Feng Hsu, Tainan County (TW); Hsien-Ting Huang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 243 days.

(21) Appl. No.: 12/326,865

(22) Filed: Dec. 2, 2008

(65) Prior Publication Data

US 2010/0134177 A1    Jun. 3, 2010

(51) Int. Cl.
*G05F 1/10* (2006.01)
*H02M 3/07* (2006.01)
(52) U.S. Cl.
CPC .................................. *H02M 3/073* (2013.01)
USPC ....................................................... 327/536
(58) Field of Classification Search
USPC ......... 327/530, 534, 535, 536, 537, 538, 540, 327/541; 363/59, 60
See application file for complete search history.

(56) References Cited

U.S. PATENT DOCUMENTS

| 5,365,121 | A  | * | 11/1994 | Morton et al. | 327/170 |
| 5,461,557 | A  | * | 10/1995 | Tamagawa | 363/60 |
| 7,116,154 | B2 | * | 10/2006 | Guo | 327/536 |
| 7,239,194 | B2 | * | 7/2007 | Azrai et al. | 327/536 |
| 7,282,985 | B2 | * | 10/2007 | Yen et al. | 327/536 |
| 7,688,131 | B2 | * | 3/2010 | Hsieh et al. | 327/536 |

FOREIGN PATENT DOCUMENTS

| TW | 200826448 | 6/2008 |
| TW | 200832877 | 8/2008 |
| TW | 200847598 | 12/2008 |

* cited by examiner

*Primary Examiner* — Sibin Chen
(74) *Attorney, Agent, or Firm* — Winston Hsu; Scott Margo

(57) ABSTRACT

A charge pump circuit includes a charging capacitor, a plurality of pumping capacitors, a charging circuit, and a pumping circuit. The charging circuit is configured for charging the charging capacitor when the charge pump circuit is under a charging phase; and the pumping circuit is configured for coupling the charging capacitor charged in the charging phase to a pumping capacitor to generate an output voltage level at the pumping capacitor according to a potential difference stored in the charging capacitor, when the charge pump circuit is under a pumping phase.

12 Claims, 4 Drawing Sheets

US 8,742,833 B2

CHARGE PUMP CIRCUIT AND METHOD THEREOF

BACKGROUND OF THE INVENTION

1. Field of the Invention

The present invention relates to a charge pump circuit, and more particularly, to a charge pump that generates a plurality output voltage according to an input voltage, and a method thereof.

2. Description of the Prior Art

A charge pump circuit is one of the most important elements in a displaying apparatus. Normally, the charge pump circuit is utilized for generating an output voltage that is higher than an input voltage of the charge pump circuit. Please refer to FIG. 1. FIG. 1 is a diagram illustrating a conventional charge pump circuit 100. The charge pump circuit 100 includes a first input switch $SW_1$, a second input switch $SW_2$, a first output switch $SW_3$, a second output switch $SW_4$, a charging capacitor $C_1$, and a pumping capacitor $C_2$. A node $N_1$ of the first input switch $SW_1$ receives the input voltage $V_i$, and a node $N_2$ of the second input switch $SW_2$ is coupled to a first ground reference voltage $V_{g1}$. The charging capacitor $C_1$ is coupled between nodes $N_3$ and $N_4$, the pumping capacitor $C_2$ is coupled between nodes $N_5$ and $N_6$, in which the node $N_5$ is utilized for outputting the output voltage $V_o$ and the node $N_6$ is coupled to a second ground reference voltage $V_{g2}$. Furthermore, the first output switch $SW_3$ is coupled between the nodes $N_3$ and $N_5$, and the second output switch $SW_4$ is coupled between the nodes $N_4$ and $N_6$.

According to the conventional charge pump circuit 100, when the first input switch $SW_1$ and the second input switch $SW_2$ are switched on, the electric charge corresponding to the voltage difference between the input voltage $V_i$ and the first ground reference voltage $V_{g1}$ is charged to the charging capacitor $C_1$. Meanwhile, the first output switch $SW_3$ and the second output switch $SW_4$ are switched off. Then, the first output switch $SW_3$ and the second output switch $SW_4$ are switched on to pump the electric charge to the pumping capacitor $C_2$. By appropriately setting the second ground reference voltage $V_{g2}$ and the capacitance of the pumping capacitor $C_2$, the output voltage $V_o$ having a voltage level higher than the input voltage $V_i$ can be generated. In view of the above-mentioned conventional charge pump circuit 100, only one output voltage is generated by the group of a charging capacitor and a pumping capacitor. When a large number of output voltage need to be generated in the displaying apparatus, a large number of the group of a charging capacitor and a pumping capacitor are also required. Therefore, this will significantly increase the cost of the displaying apparatus. Therefore, utilizing a predetermined number of capacitor to generate a plurality of output voltages for lowering the cost of each charge pump circuit is an urgent problem in the field of displaying apparatus.

SUMMARY OF THE INVENTION

One of the objectives of the present invention is to provide a charge pump that generates a plurality of output voltages according to an input voltage, and a method thereof.

According to an embodiment of the present invention, a charge pump circuit is disclosed. The charge pump circuit comprises a charging capacitor, a plurality of pumping capacitors, a charging circuit, and a pumping circuit. The charging circuit is configured for charging the charging capacitor when the charge pump circuit is under a charging phase; and the pumping circuit is configured for coupling the charging capacitor charged in the charging phase to a pumping capacitor to generate an output voltage level at the pumping capacitor according to a potential difference stored in the charging capacitor, when the charge pump circuit is under a pumping phase.

According to another embodiment of the present invention, a method of controlling a charge pump circuit is disclosed. The method of controlling the charge pump circuit comprises the steps of: when the charge pump circuit is under a charging phase, charging a charging capacitor; and when the charge pump circuit is under a pumping phase, coupling the charging capacitor charged in the charging phase to a pumping capacitor selected from a plurality of pumping capacitors to generate an output voltage level at the pumping capacitor according to a potential difference stored in the charging capacitor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
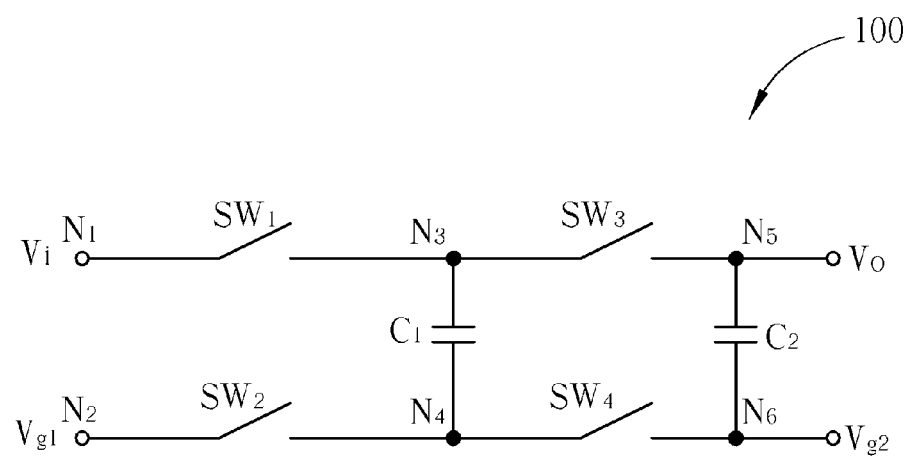
FIG. 1 is a diagram illustrating a conventional charge pump circuit.
Figure 2:
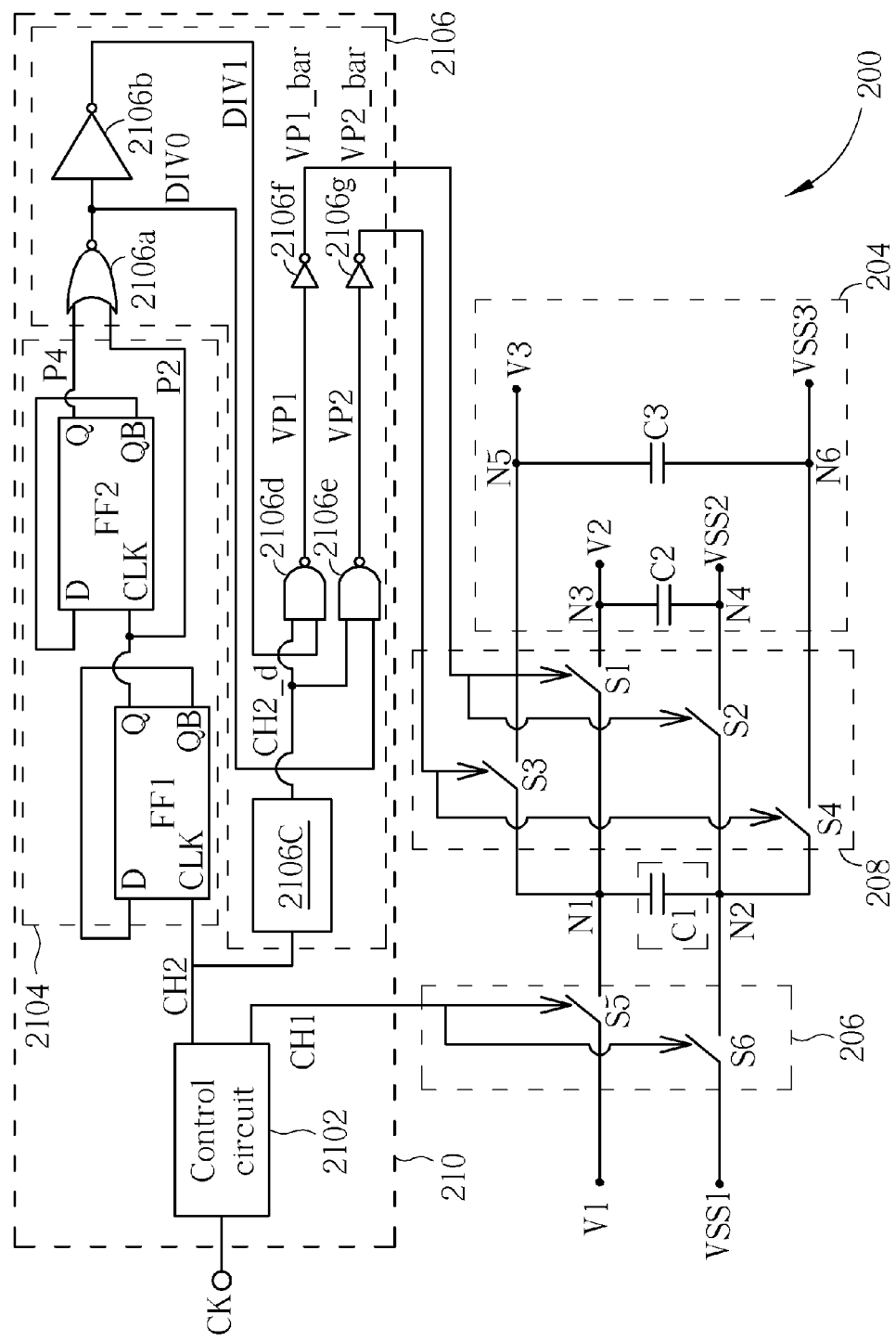
FIG. 2 is a diagram illustrating a charge pump circuit according to an embodiment of the present invention.

Please refer to FIG. 2. FIG. 2 is a diagram illustrating a charge pump circuit 200 according to an embodiment of the present invention. The charge pump circuit 200 comprises a charging capacitor C1, a first pumping capacitor C2, a second pumping capacitor C3, a charging circuit 206, and a pumping circuit 208. The pumping circuit 208 comprises a first switch S1 coupled between a first node N1 of the charging capacitor C1 and the first node N3 of the first pumping capacitor C2; a second switch S2 coupled between a second node N2 of the charging capacitor C1 and the second node N4 of the first pumping capacitor C2; a third switch S3 coupled between the first node N1 of the charging capacitor C1 and the first node N5 of the second pumping capacitor C3; and a fourth switch S4 coupled between the second node N2 of the charging capacitor C1 and the second node N6 of the second pumping capacitor C3. The charging circuit 206 comprises a first charging switch S5 coupled between a first voltage level V1 and the first node N1 of the charging capacitor C1; and a second charging switch S6 coupled between a second voltage level VSS1 and the second node N2 of the charging capacitor C1. The charge pump circuit 200 further comprises a switch control circuit 210.

Figure 3:
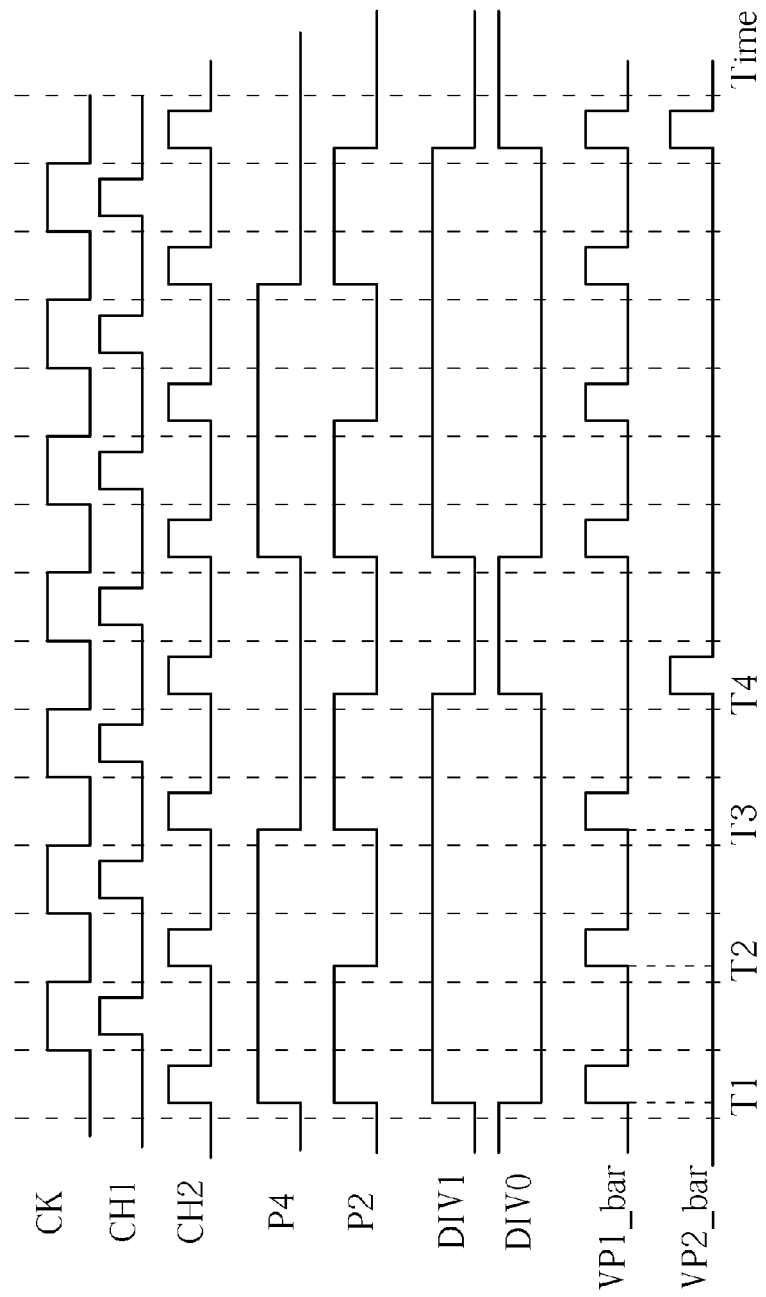
FIG. 3 is a timing diagram illustrating a first pulse signal, a second pulse signal, a clock signal, a first divided signal, a second divided signal, a combined signal, an inversed combined signal, a first pumping signal, and a second pumping signal of the charge pump circuit shown in FIG. 2.

The switch control circuit 210 comprises a control circuit 2102, a frequency divider 2104, and a clock generator 2106. The control circuit 2102 generates a first pulse signal CH1 and a second pulse signal CH2 according to a clock signal CK as shown in FIG. 3, in which the first pulse signal CH1 is utilized to control the first charging switch S5 and the second charging switch S6. FIG. 3 is a timing diagram illustrating the first pulse signal CH1, the second pulse signal CH2, the clock signal CK, a first divided signal P2, a second divided signal P4, a combined signal DIV0, an inversed combined signal DIV1, a first pumping signal VP1, and a second pumping signal VP2, in which the first pumping signal VP1 is utilized to control the first switch S1 and the second switch S2, and the second pumping signal VP2 is utilized to control the third switch S3 and the fourth switch S4. The frequency divider 2104 comprises a first flip-flop FF1 having a clock input node CLK coupled to the second pulse signal CH2, a data input node D, an inverted data output node QB coupled to the data input node D, and a non-inverted output node Q for outputting the first dividing clock P2; and a second flip-flop FF2 having a clock input node CLK coupled to the first dividing clock P2, a data input node D, an inverted data output node QB coupled to the data input node D of the second flip-flop FF2, and a non-inverted output node Q for outputting the second dividing clock P4. The clock generator 2106 comprises a NOR gate 2106a coupled to the frequency divider 2106 for performing a NOR operation upon the first dividing clock P2 and the second dividing clock P4 to generate the combined signal DIV0; an inverter 2106b coupled to the NOR gate 2106a for inverting the combined signal DIV0 to generate an inverted combined signal DIV1; a delay circuit 2106c for delaying the second pulse signal CH2 to generate a delayed second pulse signal CH2_d; a first NAND gate 2106d coupled to the inverter 2106b and the delay circuit 2106c for performing a NAND operation upon the delayed second pulse signal CH2_d and the inverted combined signal DIV1 to generate the first pumping signal VP1; and a second NAND gate 2106e coupled to the NOR gate 2106a and the delay circuit 2106c for performing a NAND operation upon the delayed second pulse signal CH2_d and the combined signal DIV0 to generate the second pumping signal VP2. Furthermore, an inverter 2106f is utilized to generate a first complementary version signal VP1_bar of the first pumping signal VP1, and an inverter 2106g is utilized to generate a second complementary version signal VP2_bar of the second pumping signal VP2. Then, the first complementary version signal VP1_bar of the first pumping signal VP1 is utilized to control the first switch S1 and the second switch S2, and the second complementary version signal VP2_bar of the second pumping signal VP2 is utilized to control the third switch S3 and the fourth switch S4. Please note that, since the first switch S1, the second switch S2, the third switch S3, the fourth switch S4, the first charging switch S5, and the second charging switch S6 are implemented by one transistor switch in this embodiment, thus the first pulse signal CH1 can be utilized to control the first charging switch S5 and the second charging switch S6, the first complementary version signal VP1_bar of the first pumping signal VP1 can be utilized to control the first switch S1 and the second switch S2, and the second complementary version signal VP2_bar of the second pumping sig-nal VP2 can be utilized to control the third switch S3 and the fourth switch S4. This is not a limitation of the present invention, however. In other words, the above-mentioned switches can also be implemented by a CMOS transistor switch. In this case, some modification may need to be performed upon the switch control circuit 210 of the above-mentioned embodiment to generate a complementary control signal for the CMOS transistor switch. For example, an inverter (not shown) can be utilized to generate the complementary version of the first pulse signal CH1, the first pumping signal VP1 and the first complementary version signal VP1_bar can be utilized to control the CMOS transistor switch, and the second pumping signal VP2 and the second complementary version signal VP2_bar can be utilized to control the other CMOS transistor switch.

Please refer to FIG. 2 in conjunction with FIG. 3. The control circuit 2102 generates the first pulse signal CH1 in each cycle of the inputted clock signal CK as shown in FIG. 3. Then, during a charging phase of the charge pump circuit 200, the first pulse signal CH1 switches on the first charging switch S5 and the second charging switch S6 to charge the charging capacitor C1 according to the first voltage level V1 and the second voltage level VSS1. Then, the switch control circuit 210 switches on the first switch S1 and the second switch S2 to pump the first pumping capacitor C2 according to the first complementary version signal VP1_bar, and switches on the third switch S3 and the fourth switch S4 to pump the second pumping capacitor C3 according to the second complementary version signal VP2_bar during a pumping phase. Furthermore, according to the embodiment of the present invention, the frequency of the first complementary version signal VP1_bar is determined by the loading of a first loading circuit (not shown) that is coupled to the first pumping capacitor C2, while the frequency of the second complementary version signal VP2_bar is determined by the loading of a second loading circuit (not shown) that is coupled to the second pumping capacitor C3. In other words, the switch control circuit 210 allocates the pulses of the second pulse signal CH2 to generate the first complementary version signal VP1_bar and the second complementary version signal VP2_bar, wherein if the first loading circuit requires more current than the second loading circuit, the first complementary version signal VP1_bar has more pulses than the second complementary version signal VP2_bar as shown in FIG. 3, and vice versa. In FIG. 2, the first flip-flop FF1 divides the frequency of the second pulse signal CH2 by two to generate the first divided signal P2 having 50% duty cycle, and the second flip-flop FF2 further divides the frequency of the first divided signal P2 by two to generate the second divided signal P4 having 50% duty cycle. Then, the NOR gate 2106a and the inverter 2106b are respectively utilized for generating the combined signal DIV0 and the inversed combined signal DIV1. Then, the NAND gate 2106 performs a NAND operation upon the inversed combined signal DIV1 and the delayed second pulse signal CH2_d for generating the first pumping signal VP1, in which the delayed second pulse signal CH2_d is the delay version of the second pulse signal CH2. The NAND gate 2106e also performs the NAND operation upon the combined signal DIV0 and the delayed second pulse signal CH2_d for generating the second pumping signal VP2. Then, the inverter 2106f generates the first complementary version signal VP1_bar of the first pumping signal VP1, and the inverter 2106g generates the second complementary version signal VP2_bar of the second pumping signal VP2. Accordingly, in every four pulses of the second pulse signal CH2, three pulses (i.e., the pulses at time T1, T2, and T3) are allocated for the first complementary version signal VP1_bar and one pulse (i.e., the pulse at time T4) is allocated for the second complementary version signal VP2_bar. Please note that the above-mentioned switch control circuit 210 and the corresponding pulse allocating ratio are not limitations of the present invention, and those skilled in this art can obtain any pulse allocating ratio through appropriate modifications upon the switch control circuit 210. This also falls within the scope of the present invention.

Accordingly, the pulses of the first pulse signal CH1 do not overlap with the pulses of the first complementary version signal VP1_bar and the second complementary version signal VP2_bar. Furthermore, the pulses of the first complementary version signal VP1_bar do not overlap with the pulses of the second complementary version signal VP2_bar. Therefore, when the pulses of the first complementary version signal VP1_bar switch on the first and the second switches S1, S2 concurrently to pump the first pumping capacitor C2, a first output voltage V2 is generated at the first node N3 of the first pumping capacitor C2, wherein the first output voltage V2 depends on a potential difference stored in the charging capacitor C1 and a third voltage level VSS2 at the second node N4 of the first pumping capacitor C2. Similarly, when the pulses of the second complementary version signal VP2_bar switch on the third and the fourth switches S3, S4 concurrently to pump the second pumping capacitor C3, a second output voltage V3 is generated at the first node N5 of the second pumping capacitor C3, wherein the second output voltage V3 depends on the potential difference stored in the charging capacitor C1 and a fourth voltage level VSS3 at the second node N6 of the second pumping capacitor C3.

Therefore, according to the above-mentioned embodiment of the present invention, two output voltages (i.e., V2, V3) can be generated by utilizing only one charging capacitor (i.e., C1). Please note that this is not a limitation of the present invention. Those skilled in this art will readily understand that more than two output voltages can also be generated through appropriate modifications upon the charge pump circuit 200 by only utilizing one charging capacitor.

Figure 4:
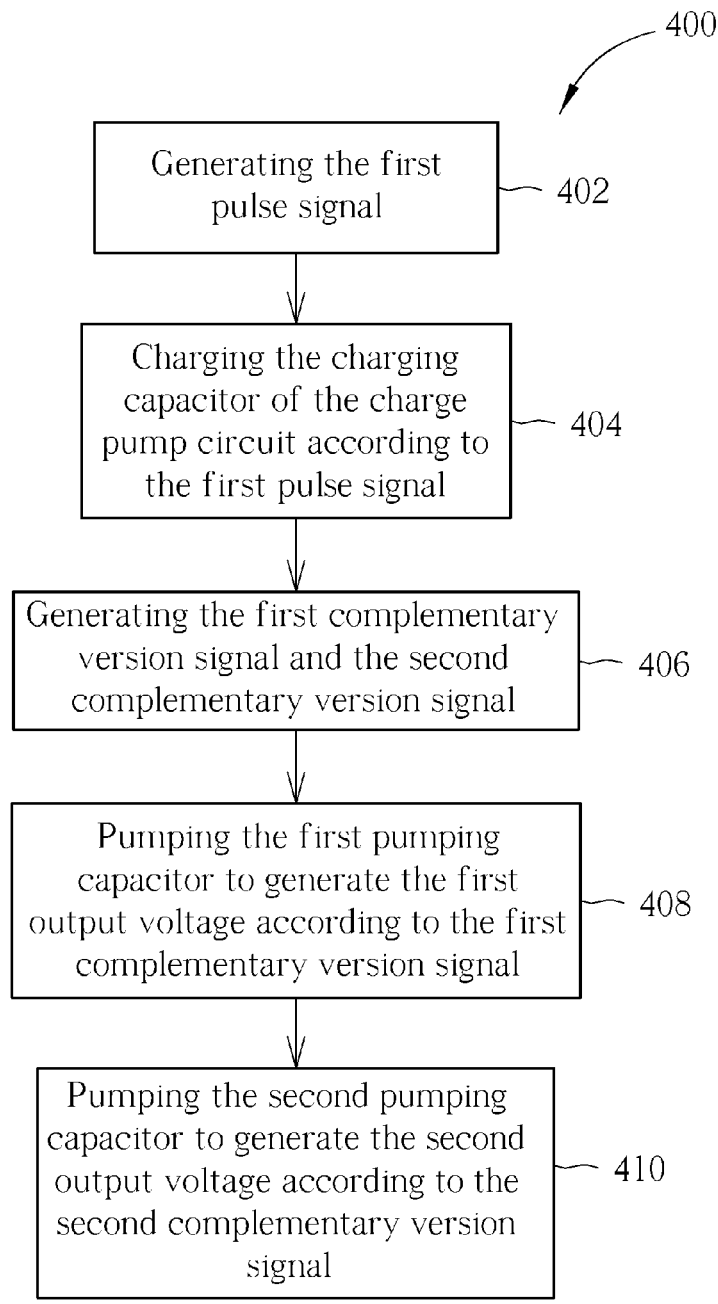
FIG. 4 is a flowchart illustrating a method of controlling the charge pump circuit according to another embodiment of the present invention.

Please refer to FIG. 4. FIG. 4 is a diagram illustrating a method 400 of controlling a charge pump circuit according to another embodiment of the present invention. Provided that substantially the same result is achieved, the steps of the flowchart shown in FIG. 4 need not be in the exact order shown and need not be contiguous, that is, other steps can be intermediate. In addition, in order to describe the spirit of the present invention more clearly, the method 400 of controlling the charge pump circuit is described in associated with the charge pump circuit 200 in FIG. 2.

The method 400 comprises the following steps:

Step 402: Generate the first pulse signal CH1;

Step 404: Charge the charging capacitor C1 of the charge pump circuit 200 according to the first pulse signal CH1;

Step 406: Generate the first complementary version signal VP1_bar and the second complementary version signal VP2_bar;

Step 408: Pump the first pumping capacitor C2 to generate the first output voltage V2 according to the first complementary version signal VP1_bar;

Step 410: Pump the second pumping capacitor C3 to generate the second output voltage V2 according to the second complementary version signal VP2_bar.

According to the method 400, the pulses of the first pulse signal CH1 do not overlap the pulses of the first complementary version signal VP1_bar and the second complementary version signal VP2_bar, and the pulses of the first complementary version signal VP1_bar do not overlap the pulses of the second complementary version signal VP2_bar. Furthermore, in the steps 408 and 410, the first output voltage V2 depends on a potential difference stored in the charging capacitor C1 and the third voltage level VSS2 at the second node N4 of the first pumping capacitor C2 (as shown in FIG. 2), and the second output voltage V3 also depends on the potential difference stored in the charging capacitor C1 and the fourth voltage level VSS3 at the second node N6 of the second pumping capacitor C3 (as shown in FIG. 2). Furthermore, those skilled in this art will readily understand that more than two output voltages can also be generated through appropriate modifications upon the method 400 by only utilizing one charging capacitor.

Those skilled in the art will readily observe that numerous modifications and alterations of the device and method may be made while retaining the teachings of the invention.

What is claimed is:

1. A charge pump circuit, comprising:
   a switch control circuit;
   a charging capacitor;
   a plurality of pumping capacitors, comprising:
      a first pumping capacitor, having a first node and a second node; and
      a second pumping capacitor, having a first node and a second node;
   a charging circuit, for charging the charging capacitor when the charge pump circuit is under a charging phase; and
   a pumping circuit, for coupling the charging capacitor charged in the charging phase to a pumping capacitor selected from the pumping capacitors to generate an output voltage level at the pumping capacitor according to a potential difference stored in the charging capacitor, when the charge pump circuit is under a pumping phase, the pumping circuit comprising:
      a first switch, coupled between a first node of the charging capacitor and the first node of the first pumping capacitor;
      a second switch, coupled between a second node of the charging capacitor and the second node of the first pumping capacitor;
      a third switch, coupled between the first node of the charging capacitor and the first node of the second pumping capacitor; and
      a fourth switch, coupled between the second node of the charging capacitor and the second node of the second pumping capacitor;
   wherein the switch control circuit switches on the first and the second switches and switches off the third and the fourth switches, concurrently; or the switch control circuit switches on the third and the fourth switches and switches off the first and the second switches, concurrently; when the switch control circuit switches on the first and the second switches and switches off the third and the fourth switches concurrently, the first pumping capacitor is coupled to the charging capacitor via the first and the second switches, and the second pumping capacitor is not coupled to the first pumping capacitor via the third and the fourth switches, and when the switch control circuit switches on the third and the fourth switches and switches off the first and the second switches concurrently, the second pumping capacitor is coupled to the charging capacitor via the third and the fourth switches, and the first pumping capacitor is not coupled to the second pumping capacitor via the first and the second switches.

2. The charge pump circuit of claim 1, wherein the first switch and the second switch are controlled by a first pumping signal, the third switch and the fourth switch are controlled by a second pumping signal, and the switch control circuit generates the first pumping signal and the second pumping signal according to a clock signal.

3. The charge pump circuit of claim 2, wherein the charging circuit comprises:
- a first charging switch, coupled between a first voltage level and the first node of the charging capacitor; and
- a second charging switch, coupled between a second voltage level and the second node of the charging capacitor, wherein the first charging switch and the second charging switch are controlled by a first pulse signal; and the switch control circuit comprises:
- a frequency divider, for dividing a second pulse signal to generate a first dividing clock and a second dividing clock, wherein a frequency of the first dividing clock is faster than the frequency of the second dividing clock; and
- a clock generator, coupled to the frequency divider, for generating the first pumping signal and the second pumping signal according to the second pulse signal, the first dividing clock, and the second dividing clock.

4. The charge pump circuit of claim 3, wherein the switch control circuit further comprises:
- a control circuit, coupled to the frequency divider and the clock generator, for generating the first pulse signal and the second pulse signal according to the clock signal.

5. The charge pump circuit of claim 3, wherein the frequency divider comprises:
- a first flip-flop, having a clock input node coupled to the second pulse signal, a data input node, an inverted data output node coupled to the data input node, and a non-inverted output node for outputting the first dividing clock; and
- a second flip-flop, having a clock input node coupled to the first dividing clock, a data input node, an inverted data output node coupled to the data input node of the second flip-flop, and a non-inverted output node for outputting the second dividing clock.

6. The charge pump circuit of claim 3, wherein the clock generator comprises:
- a NOR gate, coupled to the frequency divider, for performing a NOR operation upon the first dividing clock and the second dividing clock to generate an output clock;
- an inverter, coupled to the NOR gate, for inverting the output clock to generate an inverted output clock;
- a delay circuit, for delaying the second pulse signal to generate a delayed second pulse signal;
- a first NAND gate, coupled to the inverter and the delay circuit, for performing a NAND operation upon the delayed second pulse signal and the inverted output clock to generate the first pumping signal; and
- a second NAND gate, coupled to the NOR gate and the delay circuit, for performing a NAND operation upon the delayed second pulse signal and the output clock to generate the second pumping signal.

7. A method of controlling a charge pump circuit, comprising:
- when the charge pump circuit is under a charging phase, charging a charging capacitor; and
- when the charge pump circuit is under a pumping phase, coupling the charging capacitor charged in the charging phase to a pumping capacitor selected from a plurality of pumping capacitors to generate an output voltage level at the pumping capacitor according to a potential difference stored in the charging capacitor;

wherein the plurality of pumping capacitors comprises a first pumping capacitor and a second pumping capacitor, and the step of generating the output voltage level at the pumping capacitor comprises:
- utilizing a first switch to couple between a first node of the charging capacitor and the first node of the first pumping capacitor;
- utilizing a second switch to couple between a second node of the charging capacitor and the second node of the first pumping capacitor;
- utilizing a third switch to couple between the first node of the charging capacitor and the first node of the second pumping capacitor;
- utilizing a fourth switch to couple between the second node of the charging capacitor and the second node of the second pumping capacitor; and
- switching on the first and the second switches and switching off the third and the fourth switches, concurrently; or switching on the third and the fourth switches and switching off the first and the second switches, concurrently;

wherein when switching on the first and the second switches and switching off the third and the fourth switches concurrently, the first pumping capacitor is coupled to the charging capacitor via the first and the second switches and the second pumping capacitor is not coupled to the first pumping capacitor via the third and the fourth switches, and when switching on the third and the fourth switches and switching off the first and the second switches concurrently, the second pumping capacitor is coupled to the charging capacitor via the third and the fourth switches and the first pumping capacitor is not coupled to the second pumping capacitor via the first and the second switches.

8. The method of claim 7, wherein the charging phase of the charge pump circuit is controlled by a first pulse signal.

9. The method of claim 7, wherein the step of generating the output voltage level at the pumping capacitor further comprises:
- electrically connecting a first pumping signal to the first switch and the second switch for controlling the first switch and the second switch; and
- electrically connecting a second pumping signal to the third switch and the fourth switch for controlling the third switch and the fourth switch.

10. The method of claim 9, wherein the first pumping signal and the second pumping signal are generated by a second pulse signal.

11. The method of claim 10, wherein the charging phase of the charge pump circuit is controlled by a first pulse signal, and the first pulse signal and the second pulse signal are generated by a clock signal.

12. A charge pump circuit, comprising:
- a switch control circuit;
- a charging capacitor;
- a plurality of pumping capacitors, comprising:
  - a first pumping capacitor, having a first node and a second node; and
  - a second pumping capacitor, having a first node and a second node;
- a pumping circuit, for coupling the charging capacitor charged in a charging phase of the charge pump circuit to a pumping capacitor selected from the pumping capacitors to generate an output voltage level at the pumping capacitor when the charge pump circuit is under a pumping phase according to a potential difference stored in the charging capacitor, the pumping circuit comprising:

a first switch, coupled between a first node of the charging capacitor and the first node of the first pumping capacitor;
a second switch, coupled between a second node of the charging capacitor and the second node of the first pumping capacitor;
a third switch, coupled between the first node of the charging capacitor and the first node of the second pumping capacitor; and
a fourth switch, coupled between the second node of the charging capacitor and the second node of the second pumping capacitor;
wherein the switch control circuit switches on the first and the second switches and switches off the third and the fourth switches, concurrently; or the switch control circuit switches on the third and the fourth switches and switches off the first and the second switches, concurrently, the first switch and the second switch are controlled by a first pumping signal, the third switch and the fourth switch are controlled by a second pumping signal, and the switch control circuit generates the first pumping signal and the second pumping signal according to a clock signal; and
a charging circuit, for charging the charging capacitor when the charge pump circuit is under the charging phase, the charging circuit comprising:
a first charging switch, coupled between a first voltage level and the first node of the charging capacitor; and
a second charging switch, coupled between a second voltage level and the second node of the charging capacitor, wherein the first charging switch and the second charging switch are controlled by a first pulse signal;
wherein the switch control circuit comprises:
a frequency divider, for dividing a second pulse signal to generate a first dividing clock and a second dividing clock, wherein a frequency of the first dividing clock is faster than the frequency of the second dividing clock; and
a clock generator, coupled to the frequency divider, for generating the first pumping signal and the second pumping signal according to the second pulse signal, the first dividing clock, and the second dividing clock; and
the clock generator comprises:
a NOR gate, coupled to the frequency divider, for performing a NOR operation upon the first dividing clock and the second dividing clock to generate an output clock;
an inverter, coupled to the NOR gate, for inverting the output clock to generate an inverted output clock;
a delay circuit, for delaying the second pulse signal to generate a delayed second pulse signal;
a first NAND gate, coupled to the inverter and the delay circuit, for performing a NAND operation upon the delayed second pulse signal and the inverted output clock to generate the first pumping signal; and
a second NAND gate, coupled to the NOR gate and the delay circuit, for performing a NAND operation upon the delayed second pulse signal and the output clock to generate the second pumping signal.

* * * * *